(12) United States Patent
Beyda

(10) Patent No.: US 7,958,213 B1
(45) Date of Patent: Jun. 7, 2011

(54) PROCESSING ELECTRONIC MESSAGES

(75) Inventor: William J. Beyda, Cupertino, CA (US)

(73) Assignee: Siemens Enterprise Communications, Inc., Boca Raton, FL (US)

( * ) Notice: Subject to any disclaimer, the term of this patent is extended or adjusted under 35 U.S.C. 154(b) by 2218 days.

(21) Appl. No.: 09/668,039

(22) Filed: Sep. 21, 2000

(51) Int. Cl.
G06F 15/173 (2006.01)
G06F 17/30 (2006.01)

(52) U.S. Cl. ............. 709/223; 709/225; 726/26; 726/27

(58) Field of Classification Search .............. 726/26–33; 709/223, 225
See application file for complete search history.

(56) References Cited

U.S. PATENT DOCUMENTS

| | | | | |
|---|---|---|---|---|
| 4,586,811 A * | 5/1986 | Kubo et al. | ..................... | 399/366 |
| 5,428,529 A * | 6/1995 | Hartrick et al. | ................ | 715/513 |
| 5,444,779 A * | 8/1995 | Daniele | ........................ | 399/366 |
| 5,452,058 A * | 9/1995 | Umeda | ............................ | 399/15 |
| 5,748,783 A * | 5/1998 | Rhoads | ......................... | 382/232 |
| 5,822,660 A * | 10/1998 | Wen | ................................ | 399/194 |
| 5,842,023 A | 11/1998 | Tsumura | ........................ | 395/712 |
| 5,862,260 A | 1/1999 | Rhoads | ......................... | 382/232 |
| 5,923,486 A | 7/1999 | Sugiyama et al. | ............... | 360/60 |
| 5,933,498 A | 8/1999 | Schneck et al. | ..................... | 380/4 |
| 5,968,175 A * | 10/1999 | Morishita et al. | ............. | 713/200 |
| 5,982,956 A | 11/1999 | Lahmi | ........................... | 382/306 |
| 5,983,351 A * | 11/1999 | Glogau | ............................ | 726/26 |
| 5,991,500 A * | 11/1999 | Kanota et al. | .................... | 386/94 |
| 6,073,142 A | 6/2000 | Geiger et al. | | |
| 6,282,653 B1 * | 8/2001 | Berstis et al. | .................... | 726/26 |
| 6,298,446 B1 * | 10/2001 | Schreiber et al. | ............... | 726/27 |
| 6,351,726 B1 * | 2/2002 | Wong | ............................... | 704/3 |
| 6,526,385 B1 * | 2/2003 | Kobayashi et al. | ........... | 704/504 |
| 6,526,510 B1 * | 2/2003 | Kori et al. | ...................... | 713/176 |
| 6,591,367 B1 * | 7/2003 | Kobata et al. | .................... | 726/31 |
| 6,668,068 B2 * | 12/2003 | Hashimoto | ................... | 382/100 |
| 6,700,989 B1 * | 3/2004 | Itoh et al. | ...................... | 382/100 |
| 6,704,797 B1 * | 3/2004 | Fields et al. | .................. | 709/246 |
| 6,757,728 B2 * | 6/2004 | Stebbings | ..................... | 709/225 |
| 6,802,011 B1 * | 10/2004 | Ogino | .............................. | 726/32 |
| 6,836,846 B1 * | 12/2004 | Kanevsky et al. | ............. | 713/193 |
| 6,914,691 B1 * | 7/2005 | Sato | ............................. | 358/1.15 |
| 2003/0159065 A1 * | 8/2003 | Nakagawa et al. | ........... | 713/201 |
| 2003/0161496 A1 * | 8/2003 | Hayashi et al. | ............... | 382/100 |
| 2004/0064417 A1 * | 4/2004 | Stefik et al. | ...................... | 705/52 |
| 2004/0148191 A1 * | 7/2004 | Hoke, Jr. | ........................... | 705/1 |
| 2004/0193915 A1 * | 9/2004 | Smith et al. | ................... | 713/200 |
| 2005/0033965 A1 * | 2/2005 | Iwamura | ....................... | 713/176 |

FOREIGN PATENT DOCUMENTS

| | | |
|---|---|---|
| EP | 0 375 138 A2 | 6/1990 |
| GB | 2 317 793 A | 1/1998 |
| GB | 2 337 613 | 11/1999 |
| WO | WO 98/53403 | 11/1998 |
| WO | WO 98/58321 | 12/1998 |
| WO | WO 00/28398 | 5/2000 |

OTHER PUBLICATIONS

Method to Preclude Unauthorized Sending or Forwarding of Mail Items, IBM Technical Disclosure Bulletin, vol. 37, No. 3, Mar. 1994.

* cited by examiner

*Primary Examiner* — Ramsey Refai

(57) ABSTRACT

An electronic messaging scheme is described that is configurable to prevent intentional and unintentional transmission of electronic messages subject to one or more access restriction conditions. In accordance with one aspect of this electronic messaging scheme, an electronic message is interrogated for an access restriction notice in response to a user command to transmit the electronic message, and a detected access restriction notice is responded to in accordance with a prescribed transmission policy.

20 Claims, 4 Drawing Sheets

US 7,958,213 B1

PROCESSING ELECTRONIC MESSAGES

TECHNICAL FIELD

This invention relates to systems and methods for processing electronic messages.

BACKGROUND

Electronic messaging services, including electronic mail, voice mail and digital facsimile (or fax), are common in today's business and home environments. Electronic messaging is a powerful communications tool that enables users to exchange information and collaborate across great distances and disparate time zones. Electronic messaging systems typically allow users to exchange messages over a network, including a common local area network (LAN) and an external network (e.g., the Internet). Electronic messaging systems also typically allow users to save, copy, and forward received messages. Many electronic messaging systems provide universal or unified messaging services for handling arbitrarily complex multimedia objects. For example, the Xpressions™ unified messaging system (available from Siemens Information and Communication Networks, Inc. of Boca Raton, Fla., U.S.A.) provides unified messaging services for handling voice mail, fax, e-mail and other types of electronic media. The Xpressions™ system provides an all-in-one mailbox (or personal message) center that users may access with a computer or a telephone to manage their messages.

A wide variety of digital content types may be transmitted through today's electronic messaging systems. A substantial amount of digital content, however, is subject to certain access restriction conditions. For example, some digital content (e.g., copyrighted works, such as textual works, musical works and video works) may not be copied or transmitted without the authorization of the copyright owner. Other digital content (e.g., proprietary works, confidential works and for internal use only works) may be copied and transmitted, but only a limited number of people may be authorized to have access to that content.

SUMMARY

The invention features an electronic messaging scheme that is configurable to prevent intentional and unintentional transmission of electronic messages subject to one or more access restriction conditions.

In one aspect, the invention features an electronic messaging scheme in which an electronic message is interrogated for an access restriction notice in response to a user command to transmit the electronic message, and a detected access restriction notice is responded to in accordance with a prescribed transmission policy.

Embodiments of the invention may include one or more of the following features.

The electronic message may be interrogated by detecting an ownership notice (e.g., a copyright notice) in the electronic message. An ownership notice may be detected by comparing one or more characters in the electronic message to one or more stored ownership notice representations. An ownership notice may be detected by interrogating a header component of the electronic message.

Characters in an image component of the electronic message (e.g., a still image or a video image) may be translated into computer-readable character representations. An access restriction notice may be detected by comparing one or more translated computer-readable character representations to one or more stored access restriction representations.

A detected access restriction notice may be responded to in a variety of ways. For example, a detected access restriction may be responded to by blocking transmission of the electronic message in response to a detected access restriction notice. A detected access restriction notice may be responded to by enabling a user or a system administrator to override a blocked electronic message transmission. A detected access restriction notice may be responded to by displaying a report to a user in response to a detected access restriction notice. A detected access restriction notice may be responded to by displaying to a user a message reporting that the electronic message cannot be transmitted because of a detected access restriction. A detected access restriction notice may be responded to by displaying to a user a message reporting that a fee must be paid to enable transmission of the electronic message.

Among the advantages of the invention are the following.

The invention protects users and their employers from potential liability (e.g., liability to copyright owners for unauthorized reproduction or distribution of their copyrighted works) and potential loss of corporate assets (e.g., trade secret information) that otherwise could result from the intentional or unintentional distribution of certain kinds of electronic messages.

Other features and advantages of the invention will become apparent from the following description, including the drawings and the claims.

DETAILED DESCRIPTION

Figure 1:
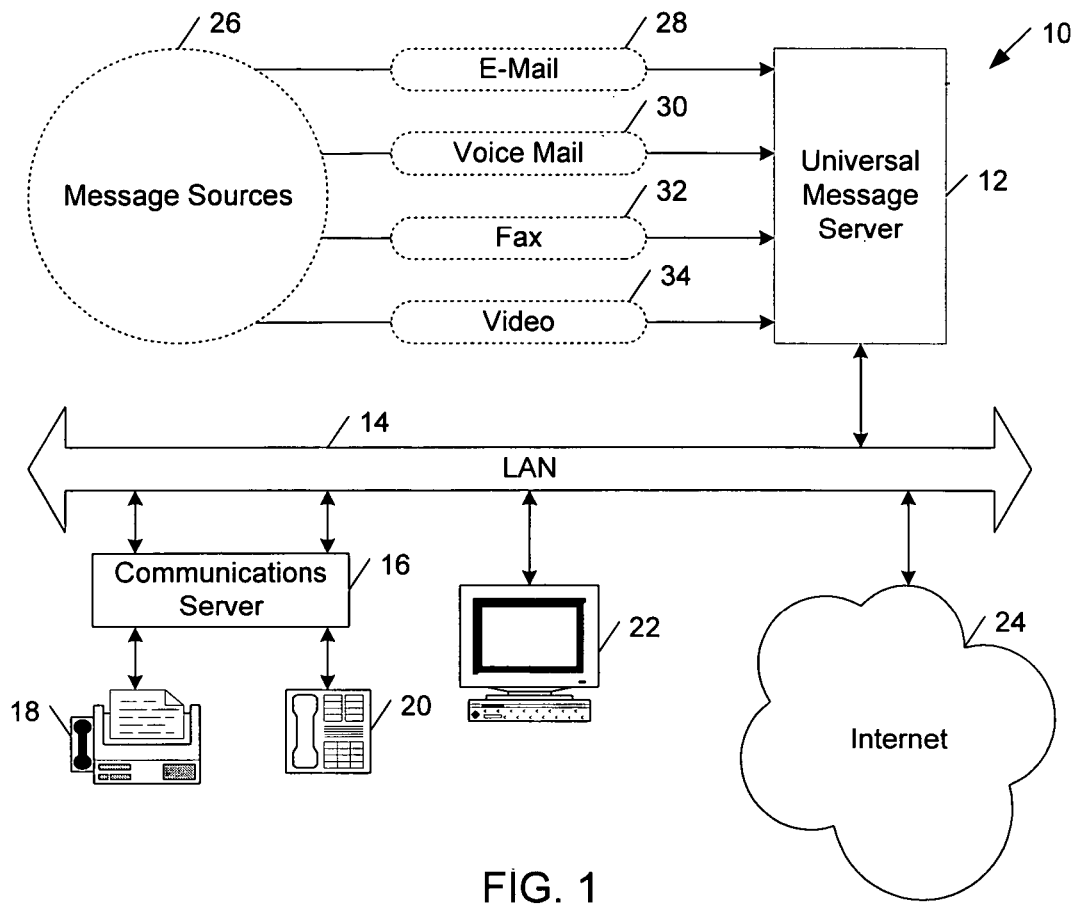
FIG. 1 is a block diagram of a universal messaging system, including a universal message server, a communications server and a plurality of communications terminals.

Referring to FIG. 1, in one embodiment, a universal messaging system 10 (e.g., an Xpressions™ universal messaging system, available from Siemens Information and Communication Networks of Boca Raton, Fla., U.S.A.) includes a universal message server 12 (e.g., an Exchange server available from Microsoft Corporation of Redmond, Wash., U.S.A.) that is coupled to a local area network (LAN) 14. A communications server 16 couples communications terminals, including a fax machine 18 and a telephone 20, to LAN 14. In addition, one or more personal computers (or workstations) 22 may be coupled to LAN 14. LAN 14 is coupled to an external network 24 (e.g., the Internet) to enable users to exchange messages with people who are not directly connected to the local area network. Universal message server 12 handles the receipt and transmission of electronic messages from a variety of different message sources 26, including e-mail messages 28, voice mail messages 30, fax messages 32 and video messages 34. Universal message server 12 provides a single repository for e-mail messages 28, voice mail messages 30, fax messages 32 and video messages 34. In operation, universal messaging system 10 provides unified messaging services for handling voice mail, fax, e-mail and other media types. In particular, universal messaging system 10 provides an all-in-one mailbox or personal message center that users may access to manage their electronic messages using a personal computer or a telephone (and in some embodiments using a personal digital assistant (PDA) or an Internet-enabled digital phone).

Figure 2:
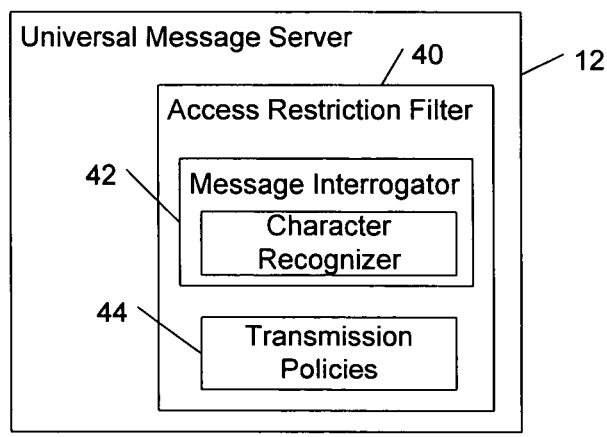
FIG. 2 is a block diagram of the universal message server of FIG. 1, including an access restriction filter.

As shown in FIG. 2 and explained in detail below, universal message server 12 includes an access restriction filter 40 that is configurable to prevent intentional and unintentional transmission of electronic messages subject to one or more access restriction conditions. In this way, access restriction filter can protect users and their employers from potential liability (e.g., liability to copyright owners for unauthorized reproduction or distribution of their copyrighted works) and potential loss of corporate assets (e.g., trade secret information) that otherwise could result from the intentional or unintentional distribution of certain kinds of electronic messages.

Figure 3:
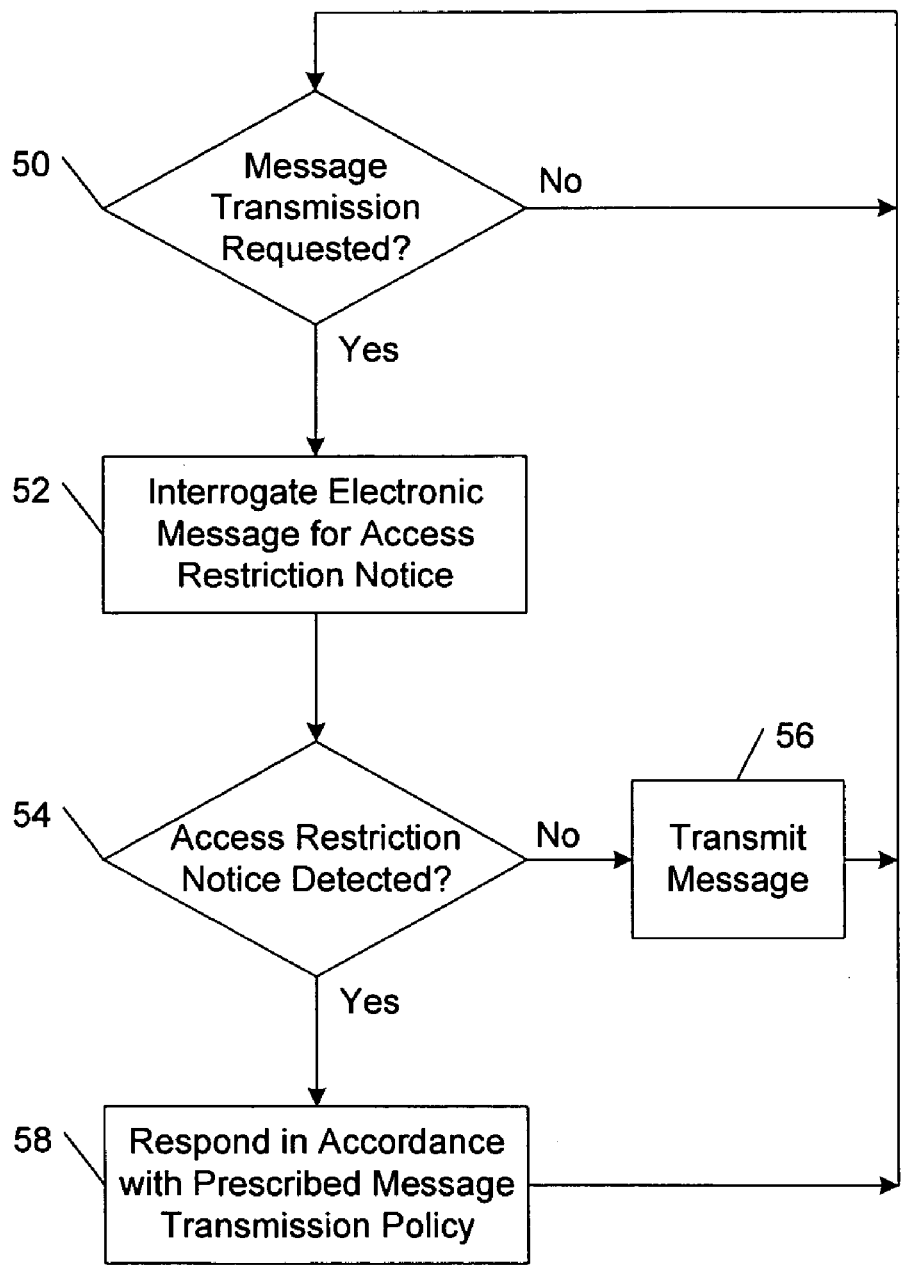
FIG. 3 is a flow diagram of a method of processing electronic messages.

Referring to FIGS. 2 and 3, in one embodiment, access restriction filter 40 includes a message interrogator 42 that is configured to interrogate or check an electronic message for an access restriction notice. Access restriction filter 40 also includes one or more prescribed transmission policies 44 specifying the way in which access restriction filter 40 responds to detected access restriction notices. As shown in FIG. 3, in one embodiment, access restriction filter 40 is configured to process an electronic message as follows. In response to a user command to transmit an electronic message (step 50), access restriction filter 40 interrogates the electronic message for an access restriction notice (step 52). If an access restriction notice is not detected (step 54), the message is transmitted (step 56); otherwise, access restriction filter 40 responds in accordance with one or more of the prescribed transmission policies 44 (step 58).

As used herein, the term "electronic message" refers broadly to an encapsulation of one or more data objects each of which may include any type of electronic content, including text, graphics, data, digitized voice and image content. An electronic message may include a primary message and any number of attachments. In addition, the term "access restriction notice" is intended to refer to any notice restricting access to information associated with the notice. Exemplary access restriction notices include "Copyright," "Confidential," "Attorney-Client Privileged" or "Attorney Work Product," "Proprietary" and "Internal Use Only."

Figure 4:
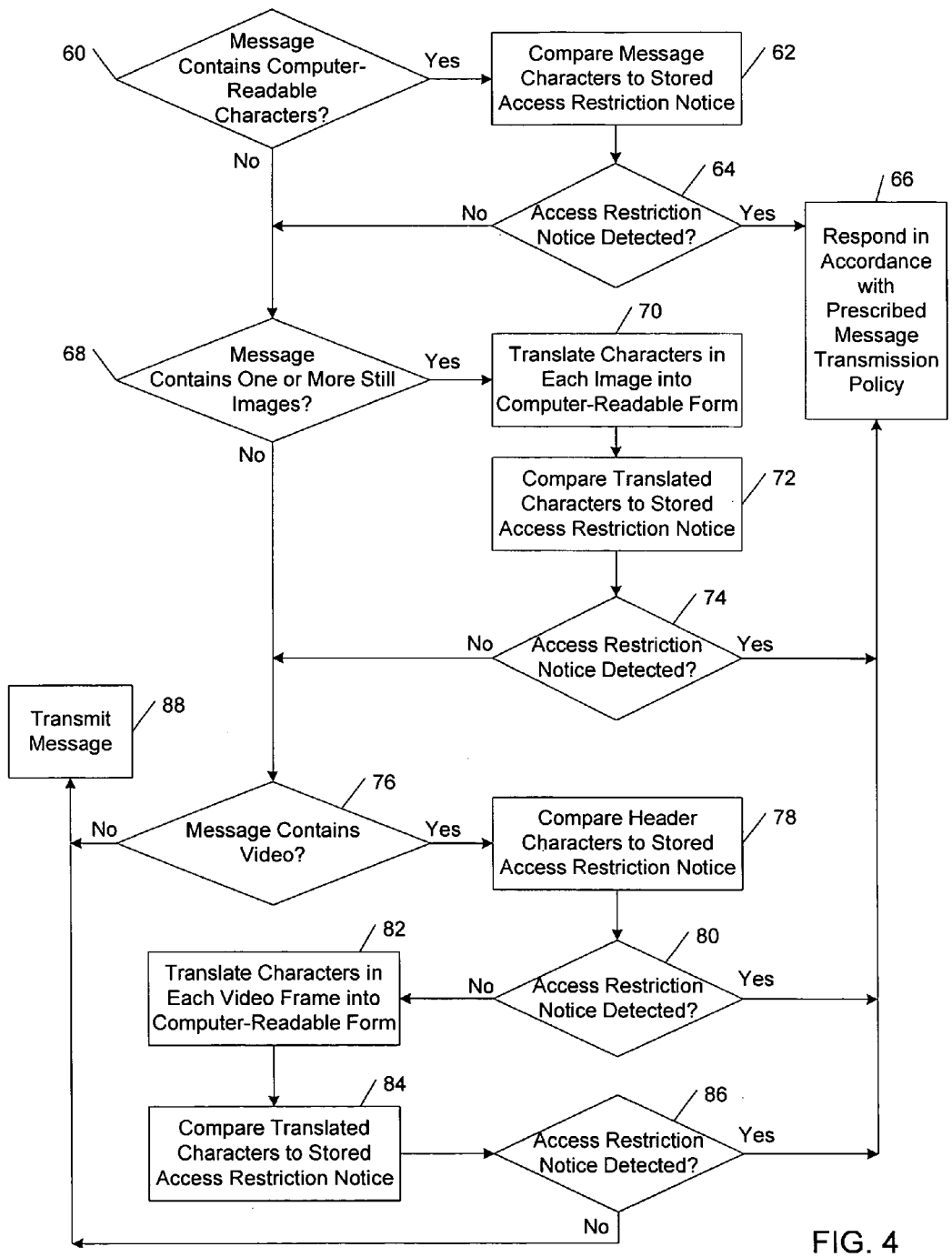
FIG. 4 is a flow diagram of a method of interrogating an electronic message for an access restriction notice.

Referring to FIG. 4, in one embodiment, the way in which access restriction filter 40 interrogates an electronic message depends on the type of content contained in the message. If the electronic message contains computer-readable characters (e.g., text represented by ASCII codes) (step 60), characters in the message are compared to one or more stored access restriction notices (step 62). For example, if the electronic message contains an e-mail message or a text document, access restriction filter 40 may search the entire e-mail message or text document for a copyright notice symbol (©). Alternatively, access restriction filter 40 may search the entire e-mail message or text document for certain kinds of access restriction notices (e.g., "Confidential," "Proprietary" and "Internal Use Only"). With respect to certain multimedia files that include text headers, such as audio files (e.g., MP3 files and WAV files), access restriction filter 40 may search the header for any access restriction notice. If an access restriction notice is detected (step 64), access restriction filter 40 responds in accordance with one or more prescribed message transmission policies (step 66). If the electronic message contains a still image (e.g., a TIF, XIF, BMP, JPEG, GIF or PDF image) (step 68), access restriction filter 40 translates characters in the image into a computer-readable format (e.g., ASCII codes) (step 70). Conventional character recognition technology may be used to translate the image data into computer-readable form. The translated characters are compared to one or more stored access restriction notices (step 72). If an access restriction notice is detected (step 74), access restriction filter 40 responds in accordance with one or more prescribed message transmission policies (step 66). If the electronic message contains video (step 76), access restriction filter 40 compares computer-readable characters in the video header to one or more stored access restriction notices (step 78). If an access restriction notice is detected (step 80), access restriction filter 40 responds in accordance with one or more prescribed message transmission policies (step 66). Otherwise, access restriction filter 40 translates characters in each video frame into a computer-readable format (e.g., ASCII codes) (step 82), and compares the translated characters to one or more stored access restriction notices. If an access restriction notice is detected (step 86), access restriction filter 40 responds in accordance with one or more prescribed message transmission policies (step 66). Otherwise, the message is transmitted (step 88).

Figure 5:
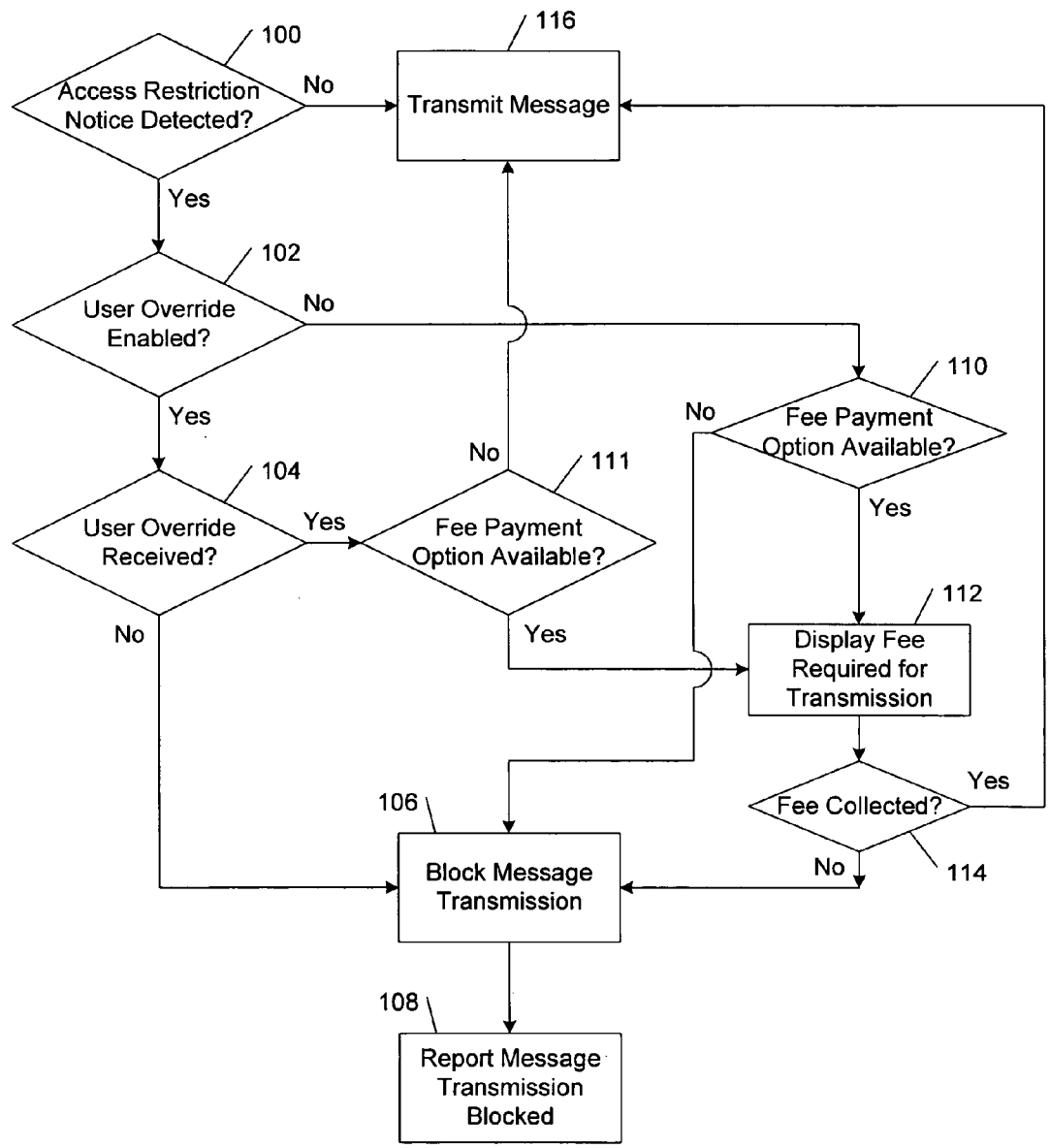
FIG. 5 is a flow diagram of a method of responding to a detected access restriction notice in accordance with a prescribed transmission policy.

As shown in FIG. 5, in one embodiment, access restriction filter may respond to a detected access restriction notice in a variety of ways. For example, in some embodiments, if an access restriction notice is detected (step 100) and a user override option is enabled (step 102), the user may override the access restriction (step 104). If a user override is not received (step 104), access restriction filter 40 blocks the transmission of the message (step 106) and reports to the user that the transmission was blocked because an access restriction notice was detected in the message (step 108). In some embodiments, an electronic message may be sent to a system administrator who would approve or deny a user's request to override a block message transmission (for "Attorney-Client Privileged" or "Attorney Work Product," an electronic message might be sent to the legal department for approval or denial of a user's request to override a block message transmission). In some embodiments, even if the user override option is not enabled (step 102), the user may be allowed to transmit a message containing an access restriction notice if a fee payment option is available (step 110). For example, certain copyrighted works (e.g., works registered with the National Copyright Clearinghouse) contain notices indicating that users may make reproductions of the works for a prescribed fee. If the fee payment option is available (step 110), access restriction filter 40 detects the required fee identified in the electronic message and displays the required fee to the user (step 112). If the transmission fee is collected (step 114), the message may be transmitted (step 116). Otherwise, access restriction filter 40 blocks the transmission of the message (step 106) and reports to the user that the transmission was blocked because the required transmission fee was not paid (step 108).

The systems and methods described herein are not limited to any particular hardware or software configuration, but rather they may be implemented in any computing or processing environment. Access restriction filter 40 preferably is implemented in a high level procedural or object oriented programming language; however, the program may be implemented in assembly or machine language, if desired. In any case, the programming language may be a compiled or interpreted language.

Other embodiments are within the scope of the claims. For example, the way in which access restriction filter 40 responds to a detected access restriction notice may vary depending upon the nature of the access restriction. Electronic messages containing copyrighted works may be blocked unless a fee payment option is available and the required fee is collected, as described above. Electronic messages containing limitations on the number or kinds of people who may receive the messages (e.g., proprietary works, confidential works and for internal use only works) may be blocked or they may be transmitted to only certain persons or certain classes of persons (e.g., persons within the same company). The names of the authorized recipients or the classes of authorized recipients may be identified in an electronic message subject to an access restriction condition, or access restriction filter 40 may be configured to respond to such notices in a predetermined way (e.g., transmission policies 44 may identify the names or classes of authorized recipients).

What is claimed is:

1. An electronic messaging system for filtering electronic messages, comprising
    a message server operable to receive and transmit electronic messages including electronic mail messages, the message server comprising an access restriction filter comprising a character recognizer configured to translate characters in image components of respective ones of electronic messages into computer-readable character representations,
    wherein the access restriction filter is configured to detect an access restriction notice in the respective ones of the electronic messages by comparing the one or more translated computer-readable character representations respectively produced by the character recognizer to respective representations of one or more access restriction notices stored in memory, the access restriction filter being additionally configured to respond to the detection of the access restriction notice in accordance with a prescribed transmission policy for handling electronic messages containing the detected access restriction notice.

2. The system of claim 1, wherein the access restriction filter is configured to detect in respective ones of the electronic messages an access restriction notice indicating ownership of at least a portion of the respective ones of the electronic messages.

3. The system of claim 2, wherein the access restriction filter is configured to detect a copyright notice in respective ones of the electronic messages.

4. The system of claim 3, wherein the access restriction filter is configured to detect the copyright notice by comparing one or more characters in the respective ones of the electronic messages to respective characters of one or more copyright notices stored in memory.

5. The system of claim 3, wherein the access restriction filter is configured to detect the copyright notice by comparing characters in a header component of the respective ones of the electronic messages with respective characters of the one or more stored copyright notices.

6. A method of filtering electronic messages, comprising:
    translating characters in image components of respective ones of electronic messages into computer-readable character representations;
    detecting an access restriction notice in the respective ones of the electronic messages by comparing the one or more translated computer-readable character representations to respective representations of one or more access restriction notices stored in memory; and
    responding to the detection of the access restriction notice in accordance with a prescribed transmission policy for handling electronic messages containing the detected access restriction notice.

7. The method of claim 6, wherein the detecting comprises detecting in respective ones of the electronic message an access restriction notice indicating ownership of at least a portion of the respective ones of the electronic messages.

8. The method of claim 7, wherein the detecting comprises detecting a copyright notice in respective ones of the electronic messages.

9. The method of claim 8, wherein the detecting comprises comparing one or more characters in the respective ones of the electronic messages to respective characters of one or more copyright notices stored in memory.

10. The method of claim 8, wherein the detecting comprises comparing characters in a header component of the respective ones of the electronic messages with respective characters of the one or more stored copyright notices.

11. A computer-readable medium comprising computer-readable instructions for causing a computer to perform operations, comprising:
    translating characters in image components of respective ones of electronic messages into computer-readable character representations;
    detecting an access restriction notice in the respective ones of the electronic messages by comparing the one or more translated computer-readable character representations to respective representations of one or more access restriction notices stored in memory; and
    responding to the detection of the access restriction notice in accordance with a prescribed transmission policy for handling electronic messages containing the detected access restriction notice.

12. The system of claim 1, wherein the access restriction filter is configured to detect at least one of the following access restriction notices in the electronic messages: a "confidential" notice, an "internal use only" notice, an "attorney-client privileged" notice, and an "attorney work product" notice.

13. The method of claim 6, wherein the detecting comprises detecting at least one of the following access restriction notices in the electronic messages: a "confidential" notice, an "internal use only" notice, an "attorney-client privileged" notice, and an "attorney work product" notice.

14. The computer-readable medium of claim 11, wherein said code provides instructions for detecting in the electronic messages at least one of a "copyright" notice, a "confidential" notice, an "internal use only" notice, an "attorney-client privileged" notice, and an "attorney work product" notice.

15. The system of claim 1, wherein at least one of the electronic messages comprises a primary message and at least one attachment, and the access restriction filter is configured to compare characters in the primary message and characters in the at least one attachment to respective characters of the one or more stored access restriction notices.

16. The system of claim 1, wherein the access restriction filter is configured to trigger display of a report to a user in response to the detection of the access restriction notice.

17. The system of claim 16, wherein the access restriction filter is configured to trigger display to a user a message reporting that a corresponding one of the electronic messages cannot be transmitted because of the detection of the access restriction.

18. The method of claim 6, wherein the responding comprises displaying a report to a user in response to the detection of the access restriction notice.

19. The method of claim 18, wherein the responding comprises displaying to a user a message reporting that a corresponding one of the electronic messages cannot be transmitted because of the detection of the access restriction.

20. The system of claim 1, wherein character recognizer configured to translate characters in image components of respective ones of electronic mail messages into computer-readable character representations, and the access restriction filter is configured to detect an access restriction notice in the respective ones of the electronic mail messages by comparing the one or more translated computer-readable character representations respectively produced by the character recognizer to respective representations of one or more access restriction notices stored in memory.

* * * * *